US012803209B2

(12) United States Patent
Nozaki et al.

(10) Patent No.: US 12,803,209 B2
(45) Date of Patent: Nov. 17, 2026

(54) CONNECTOR WITH RETAINER

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shinji Nozaki, Mie (JP); Daisuke Saito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 406 days.

(21) Appl. No.: 18/571,242

(22) PCT Filed: Jun. 16, 2022

(86) PCT No.: PCT/JP2022/024062
§ 371 (c)(1),
(2) Date: Dec. 17, 2023

(87) PCT Pub. No.: WO2023/276684
PCT Pub. Date: Jan. 5, 2023

(65) Prior Publication Data

US 2024/0291190 A1 Aug. 29, 2024

(30) Foreign Application Priority Data

Jun. 29, 2021 (JP) ................................ 2021-107477

(51) Int. Cl.
*H01R 13/42* (2006.01)
*H01R 13/436* (2006.01)
*H01R 13/625* (2006.01)

(52) U.S. Cl.
CPC ......... *H01R 13/42* (2013.01); *H01R 13/4368* (2013.01); *H01R 13/436* (2013.01); *H01R 13/4367* (2013.01); *H01R 13/625* (2013.01)

(58) Field of Classification Search
CPC .. H01R 13/42; H01R 13/436; H01R 13/4364; H01R 13/4365; H01R 13/4367; H01R 13/4368; H01R 13/625
See application file for complete search history.

(56) References Cited

U.S. PATENT DOCUMENTS

2024/0322479 A1* 9/2024 Nozakii ............. H01R 13/4223

FOREIGN PATENT DOCUMENTS

EP 0388489 A1 * 9/1990 ........... H01R 13/436
JP H05-258795 A 10/1993

(Continued)

OTHER PUBLICATIONS

International Search Report issued on Jul. 12, 2022 for WO 2023/276684 A1 (4 pages).

*Primary Examiner* — Renee S Luebke
*Assistant Examiner* — Paul D Baillargeon
(74) *Attorney, Agent, or Firm* — Venjuris, P.C.

(57) ABSTRACT

A connector is provided with a housing (10) for accommodating a terminal fitting (25) and a retainer (32) attached to the housing (10) and relatively displaceable between a temporary locking position for enabling insertion of the terminal fitting (25) into the housing (10) and a complete locking position for restricting separation of the terminal fitting (25) from the housing (10). An outer surface (32R) of the retainer (32) is formed with an accommodation recess (Continued)

(34) for accommodating the housing (10). A displacement path of the retainer (32) from the temporary locking position to the complete locking position is set in a two-dimensional plane parallel to a rear surface (10R) of the housing (10) in an opening of the accommodation recess (34).

7 Claims, 15 Drawing Sheets

(56) References Cited

FOREIGN PATENT DOCUMENTS

| | | | |
|---|---|---|---|
| JP | 2005-158347 | A | 6/2005 |
| JP | 2009-117269 | A | 5/2009 |
| JP | 2010-238514 | A | 10/2010 |
| JP | 2012-064462 | A | 3/2012 |

* cited by examiner

CONNECTOR WITH RETAINER

CROSS REFERENCE TO RELATED APPLICATIONS

This application is a national phase of PCT application No. PCT/JP2022/024062, filed on 16 Jun. 2022, which claims priority from Japanese patent application No. 2021-107477, filed on 29 Jun. 2021, all of which are incorporated herein by reference.

TECHNICAL FIELD

The present disclosure relates to a connector.

BACKGROUND

Patent Document 1 discloses a connector in which a terminal fitting inserted into a housing is retained by a retainer. The retainer is movable between a temporary locking position for allowing the insertion of the terminal fitting into the housing and a complete locking position for locking and retaining the terminal fitting. The retainer at the temporary locking position projects from the outer surface of the housing. By pushing the retainer at the temporary locking position into the housing, the retainer moves to the complete locking position. If the retainer is pushed to the complete locking position, the terminal fitting cannot be inserted. Thus, the retainer needs to be held at the temporary locking position when the terminal fitting is inserted into the housing.

In the connector of Patent Document 1, a protrusion formed on the housing is passed through the retainer as a means for preventing the retainer at the temporary locking position from moving to the complete locking position by being pushed by an external matter. The protrusion projects further outward than the outer surface of the retainer. When an external matter approaches the retainer, the contact of the external matter with the retainer can be prevented by the protrusion. In this way, the retainer at the temporary locking position can be prevented from moving to the complete locking position by being pushed by the external matter.

PRIOR ART DOCUMENT

Patent Document

Patent Document 1: JP 2009-117269 A

SUMMARY OF THE INVENTION

Problems to be Solved

Since the protrusion is present only in a part of the outer surface of the retainer, there is a possibility that an external matter interferes with a part distant from the protrusion, out of the outer surface of the retainer. Thus, if the external matter contacts a part distant from the protrusion, out of the outer surface of the retainer, the retainer at the temporary locking position may be pushed to the complete locking position.

A connector of the present disclosure was completed on the basis of the above situation and aims to reliably hold a retainer at a temporary locking position.

Means to Solve the Problem

The present disclosure is directed to a connector with a housing for accommodating a terminal fitting and a retainer attached to the housing, the retainer being relatively displaceable between a temporary locking position for enabling insertion of the terminal fitting into the housing and a complete locking position for restricting separation of the terminal fitting from the housing, an outer surface of one member, out of the housing and the retainer, being formed with an accommodation recess for accommodating the other member, out of the housing and the retainer, and a displacement path of the retainer from the temporary locking position to the complete locking position being set in a two-dimensional plane parallel to an exposed surface of the other member in an opening of the accommodation recess.

Effect of the Invention

According to the present disclosure, a retainer can be reliably held at a temporary locking position.

DESCRIPTION OF EMBODIMENTS

Description of Embodiments of Present Disclosure

Figure 1:
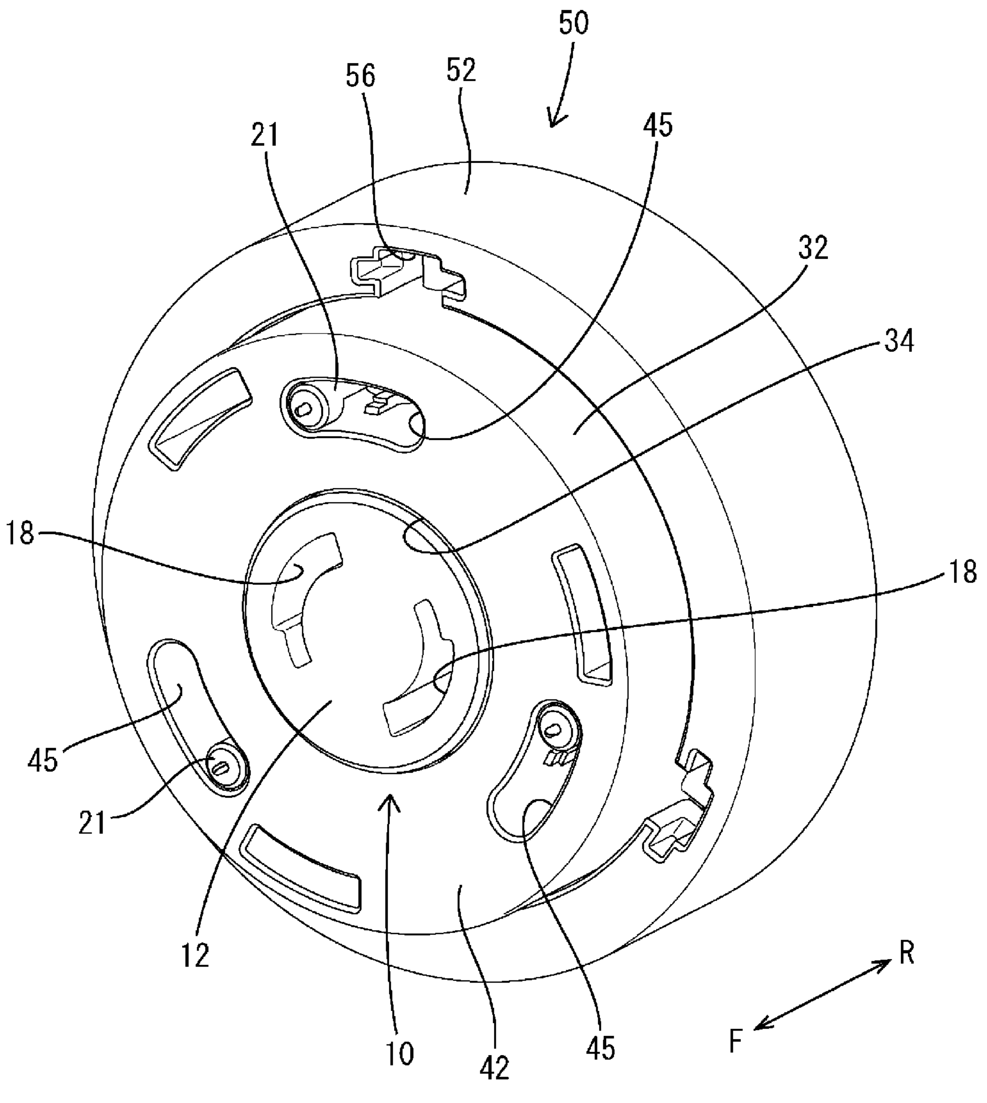
FIG. 1 is a perspective view of a connector of one embodiment when viewed obliquely from front.

First, embodiments of the present disclosure are listed and described.

(1) The connector of the present disclosure is provided with a housing for accommodating a terminal fitting and a retainer attached to the housing, the retainer being relatively displaceable between a temporary locking position for enabling insertion of the terminal fitting into the housing and a complete locking position for restricting separation of the terminal fitting from the housing, an outer surface of one member, out of the housing and the retainer, being formed with an accommodation recess for accommodating the other member, out of the housing and the retainer, and a displacement path of the retainer from the temporary locking position to the complete locking position being set in a two-dimensional plane parallel to an exposed surface of the other member in an opening of the accommodation recess. According to the configuration of the present disclosure, even if the outer surface of the one member and the exposed surface of the other member are pressed by an external matter, the retainer at the temporary locking position is not relatively displaced to the complete locking position, wherefore the retainer can be reliably held at the temporary locking position.

(2) Preferably, the exposed surface of the other member is arranged at a position flush with the outer surface of the one member or at a position recessed from the outer surface. According to this configuration, when an external matter approaches the exposed surface, the external matter interferes with the outer surface of the one member, whereby an impact on the exposed surface by the external matter can be mitigated or prevented.

(3) Preferably, an inner peripheral surface of the accommodation recess and an outer peripheral surface of the other member have arcuate guide surfaces capable of sliding in contact with each other, and the retainer is displaced from the temporary locking position to the complete locking position while rotating by the guide surfaces sliding in contact with each other. When an external matter interferes to rub the outer surface of the one member and the exposed surface of the other member, a direction of that interference is a linear direction. However, since a movement when the retainer is displaced from the temporary locking position to the complete locking position is a rotational movement, the retainer at the temporary locking position hardly moves to the complete locking position even if the external matter interferes to rub the outer surface of the one member and the exposed surface of the other member.

(4) Preferably, the other member is formed with a resilient holding piece for holding the retainer at the temporary locking position, and the resilient holding piece is arranged along the exposed surface. According to this configuration, since the resilient holding piece does not project from the exposed surface, an external matter hardly interferes with the resilient holding piece and the reliability of a holding function by the resilient holding piece is excellent.

(5) Preferably in (4), the resilient holding piece is arranged at a position flush with the outer surface of the one member or at a position recessed from the outer surface. According to this configuration, when an external matter approaches the exposed surface, the external matter interferes with the outer surface of the other member, whereby an impact on the resilient holding piece by the external matter can be mitigated or prevented.

Details of Embodiment of Present Disclosure

Embodiment

One specific embodiment of a connector of the present disclosure is described with reference to FIGS. 1 to 15. Note that the present invention is not limited to these illustrations, but is represented by claims and intended to include all changes in the scope of claims and in the meaning and scope of equivalents. In this embodiment, a direction indicated by an arrow Fin FIGS. 1 to 3, 8, 11 and 15 is defined as a forward direction and a direction indicated by an arrow R is defined as a rearward direction concerning a front-rear direction.

Figure 2:
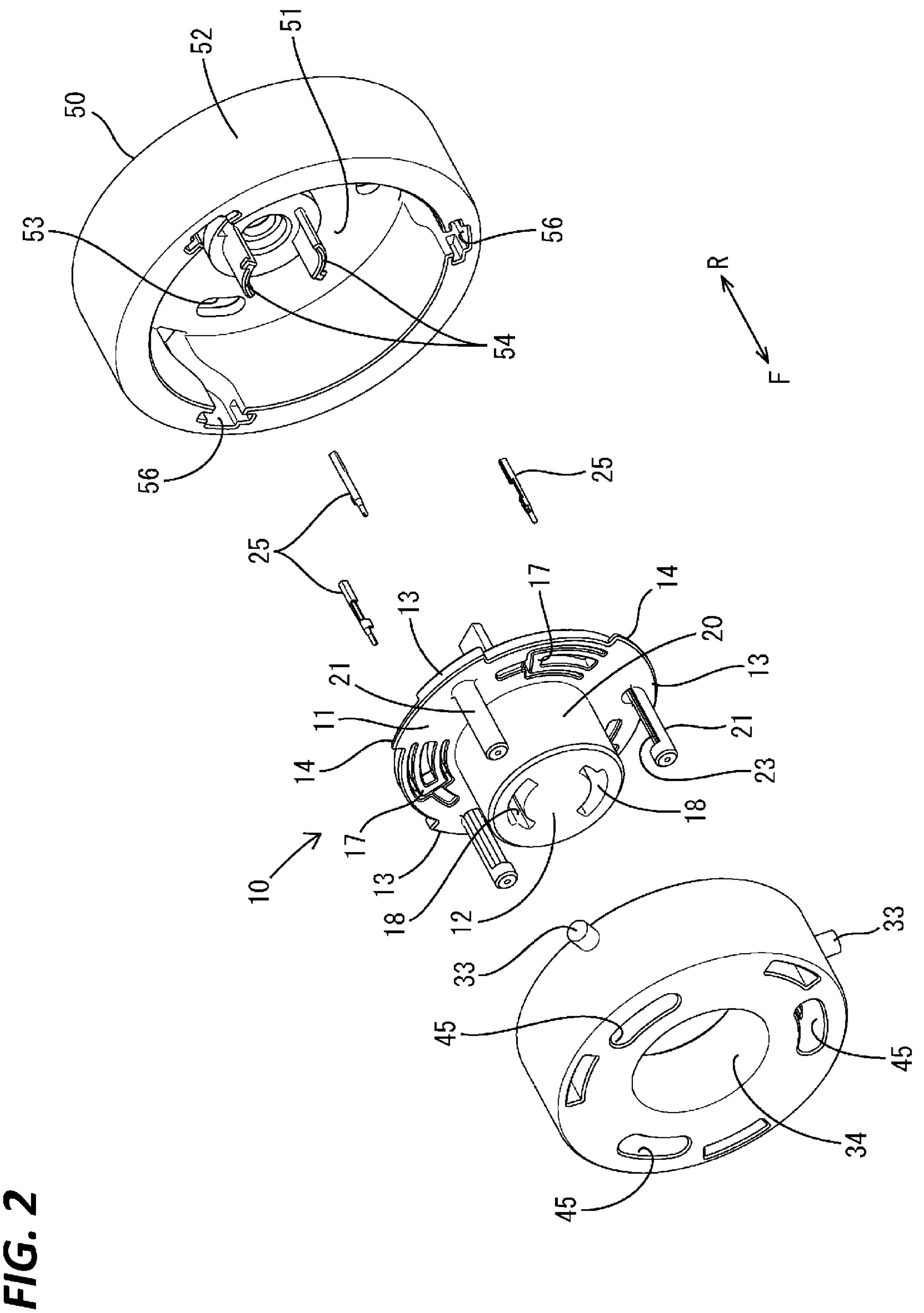
FIG. 2 is a perspective view of the connector in a disassembled state when viewed obliquely from front.
Figure 3:
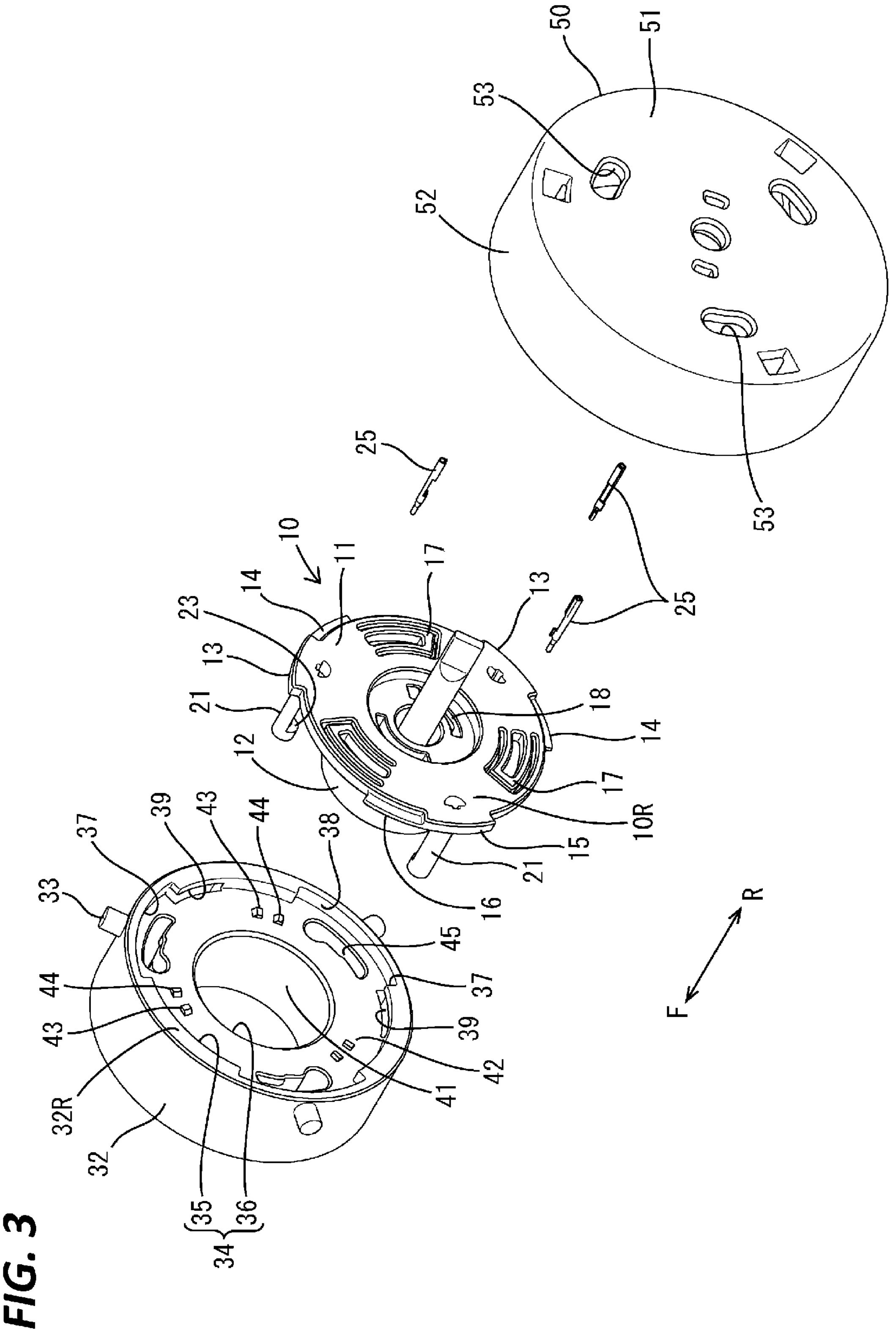
FIG. 3 is a perspective view of the connector in the disassembled state when viewed obliquely from behind.

As shown in FIGS. 1 to 3, a connector of this embodiment is provided with a housing 10, three terminal fittings 25, a retainer 32 and a cover 50. The housing 10 is a single component made of synthetic resin. As shown in FIGS. 2 and 3, the housing 10 includes a disk portion 11 having a plate thickness direction oriented in the front-rear direction, a cylindrical portion 12 concentrically projecting forward from the front surface of the disk portion 11 and three terminal accommodating portions 21 projecting forward from the front surface of the disk portion 11.

Figure 7:
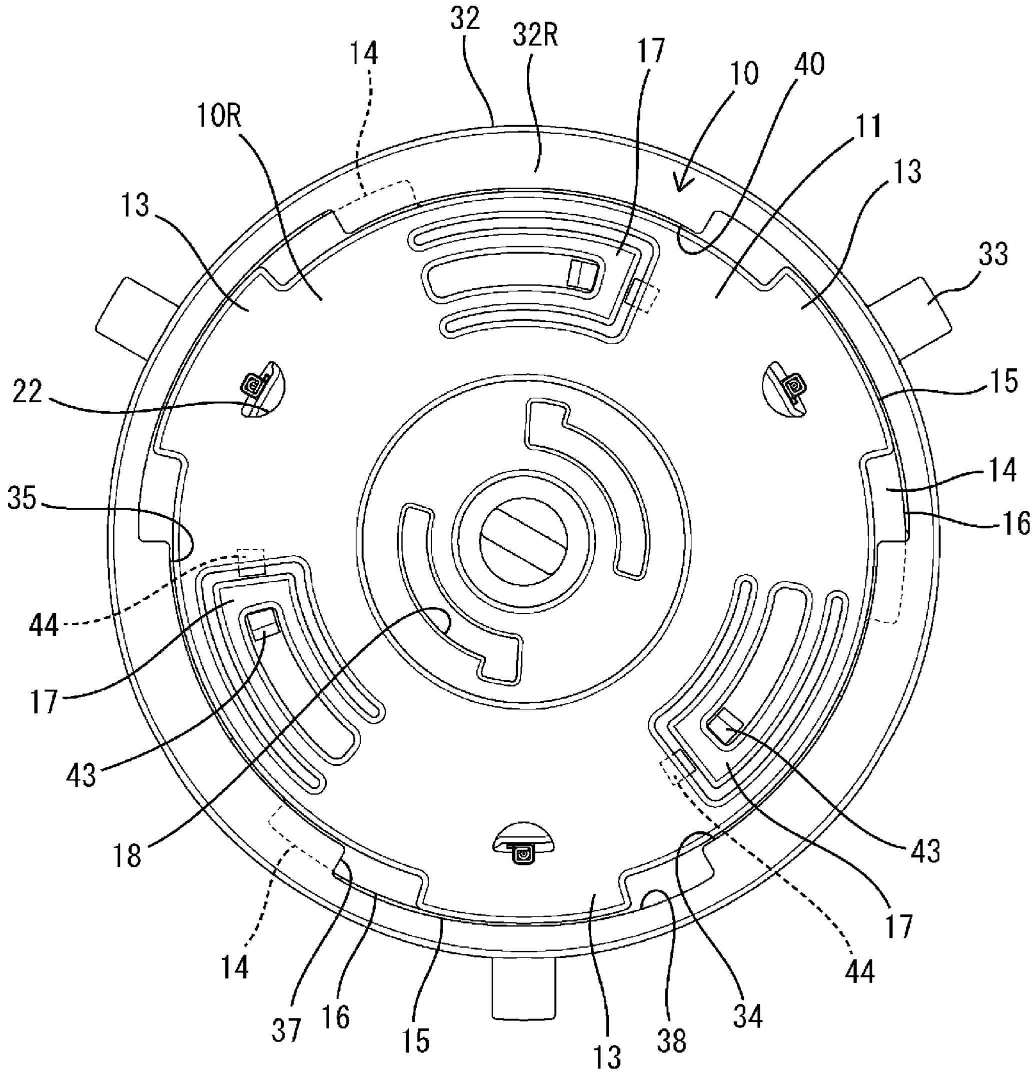
FIG. 7 is a back view showing the state where the retainer is at the temporary locking position.
Figure 10:
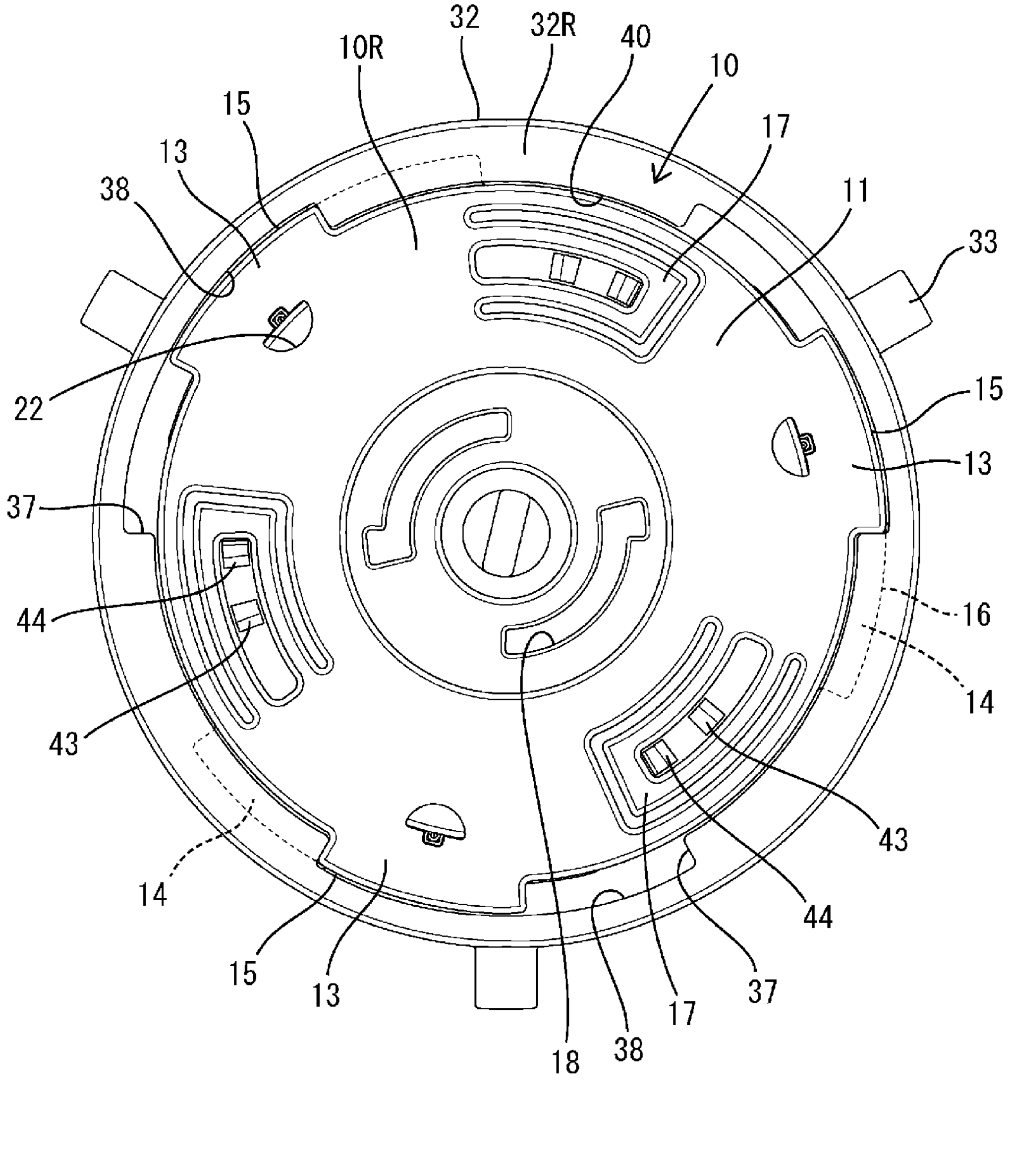
FIG. 10 is a back view showing the state where the retainer is at the complete locking position.

Three guide protrusions 13 and three retaining ribs 14 are formed on an outer peripheral edge part of the disk portion 11. The three guide protrusions 13 have an arc shape concentric with the disk portion 11 and are arranged at equal angular intervals in a circumferential direction. The rear surface of the guide protrusion 13 is continuous and flush with the disk portion 11, i.e. a rear surface 10R of the housing 10. As shown in FIGS. 7 and 10, the outer peripheral surface of the guide protrusion 13 functions as a first outer peripheral guide surface 15.

The three retaining ribs 14 have an arc shape concentric with the disk portion 11. In a back view of the housing 10, the retaining rib 14 is arranged adjacent to the guide protrusion 13 on a clockwise side. The rear surface of the retaining rib 14 is arranged to be recessed forward from the rear surfaces of the disk portion 11 and the guide protrusion 13. Regions where the guide protrusions 13 and the retaining ribs 14 are not formed, out of the outer peripheral surface of the disk portion 11, function as second outer peripheral guide surfaces 16.

The disk portion 11 is formed with three resilient holding pieces 17 arranged at equal angular intervals in the circumferential direction. The resilient holding piece 17 is arranged along the outer peripheral edge of the disk portion 11. The resilient holding piece 17 has an arc shape concentric with the disk portion 11 and is in the form of an arm cantilevered in a clockwise direction in the back view. In the front-rear direction, the front surface of the resilient holding piece 17 is at the same position as the front surface of the disk portion 11, and the rear surface of the resilient holding piece 17 is at the same position as the rear surface of the disk portion 11. The resilient holding piece 17 can be resiliently displaced in the front-rear direction with an end part on a counterclockwise side in the back view as a fulcrum.

Figure 13:
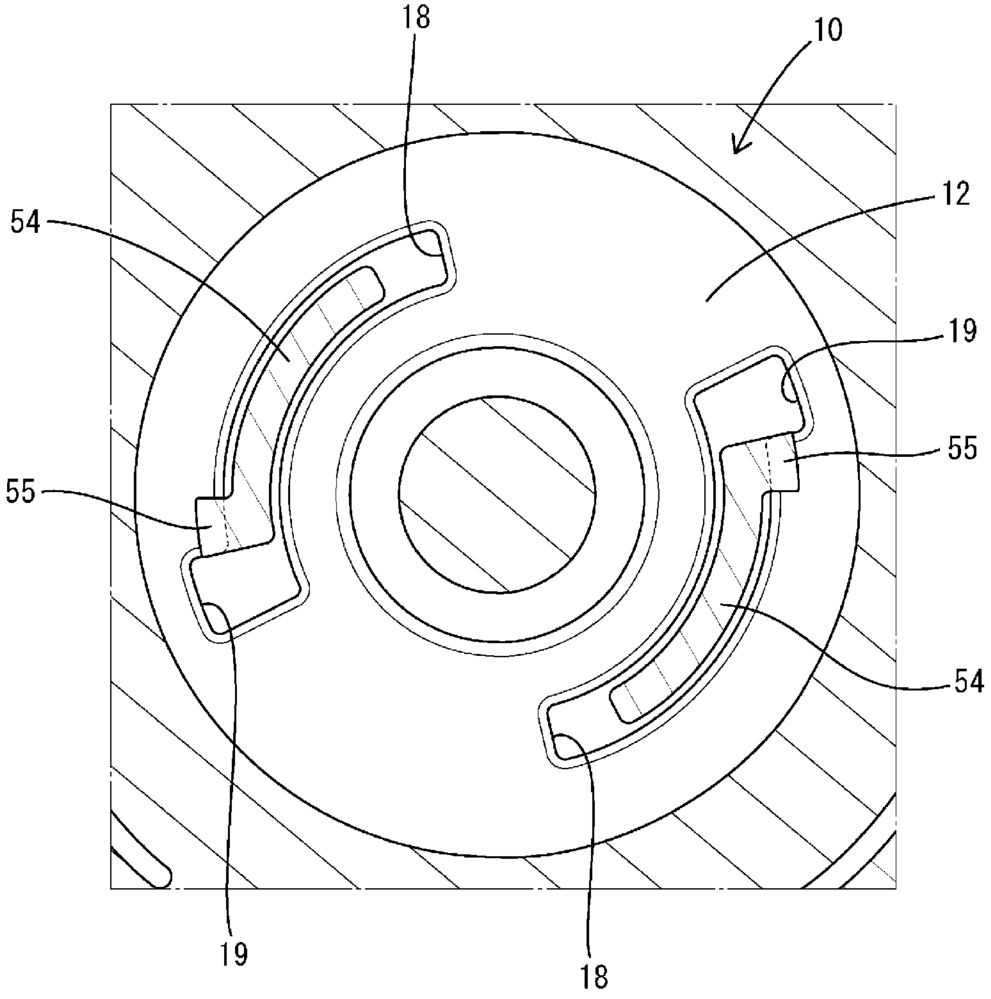
FIG. 13 is a partial enlarged back view in section showing a state where the cover is assembled with the retainer at the temporary locking position.
Figure 14:
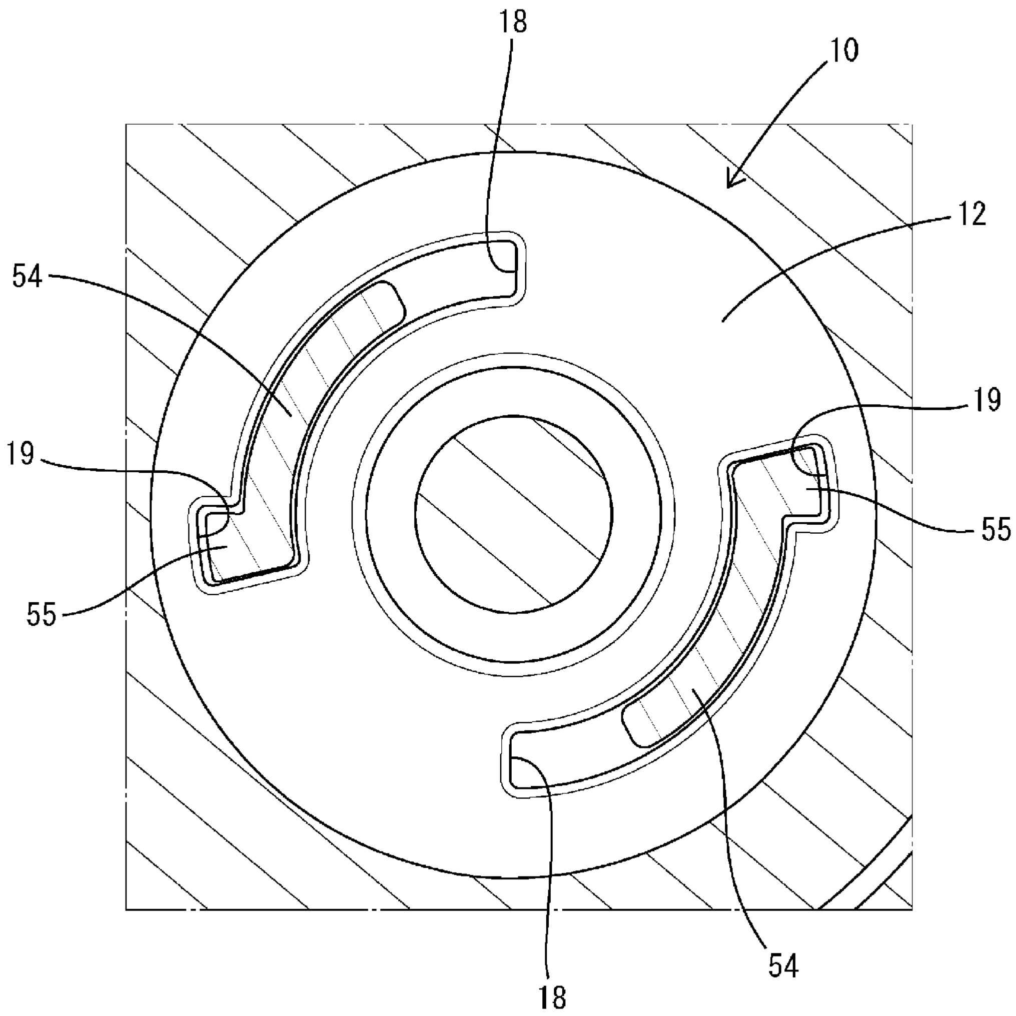
FIG. 14 is a partial enlarged back view in section showing the state where the cover is assembled with the retainer at the complete locking position.
Figure 15:
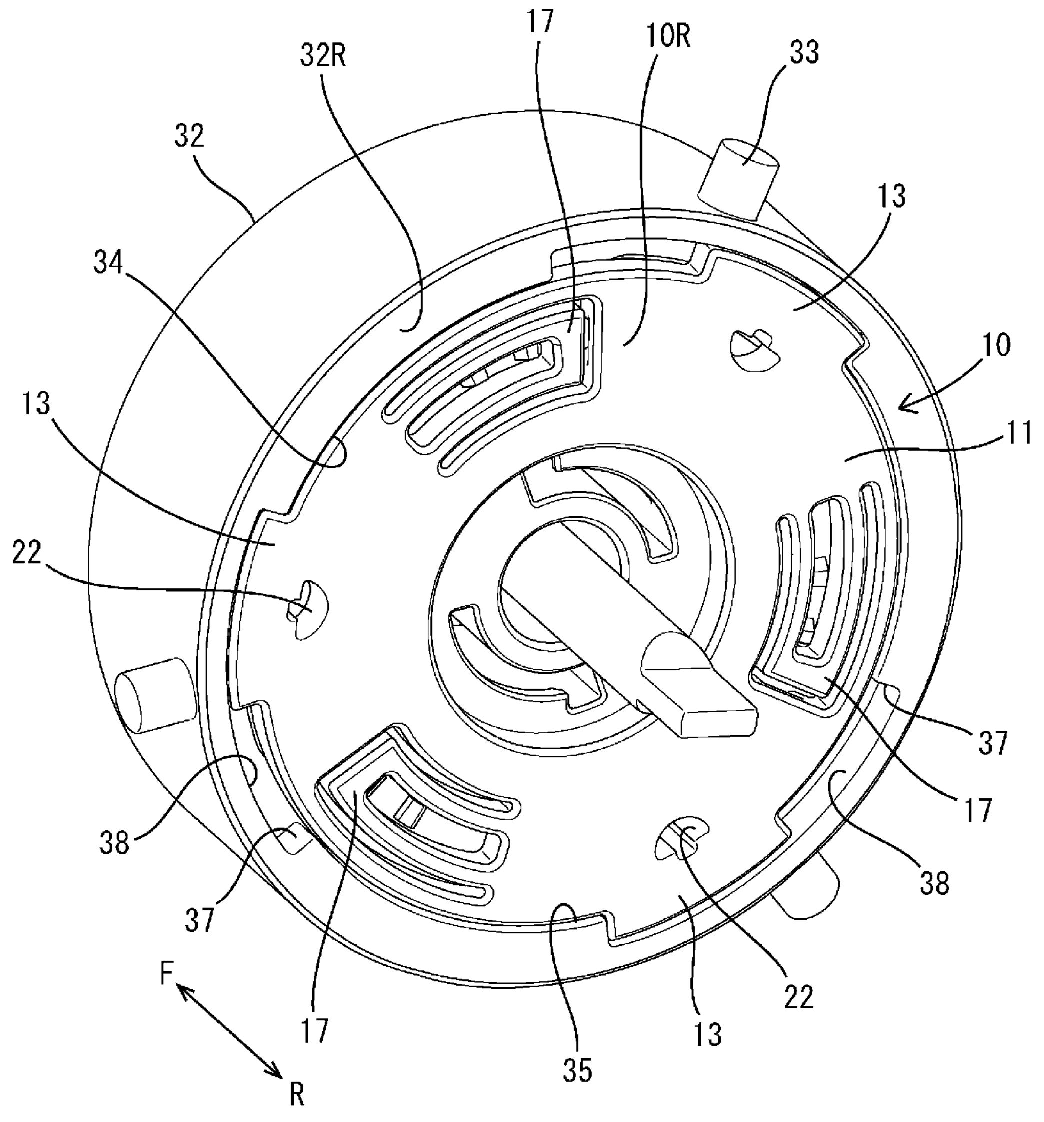
FIG. 15 is a perspective view of the connector when viewed obliquely from behind.

The cylindrical portion 12 is formed with two detection grooves 18 having an arc shape concentric with the cylindrical portion 12. As shown in FIGS. 13 and 14, a detection recess 19 recessed radially outward is formed on an end part on a counterclockwise side of the detection groove 18 in a back view. As shown in FIG. 2, the outer peripheral surface of the cylindrical portion 12 functions as a third outer peripheral guide surface 20.

Figure 8:
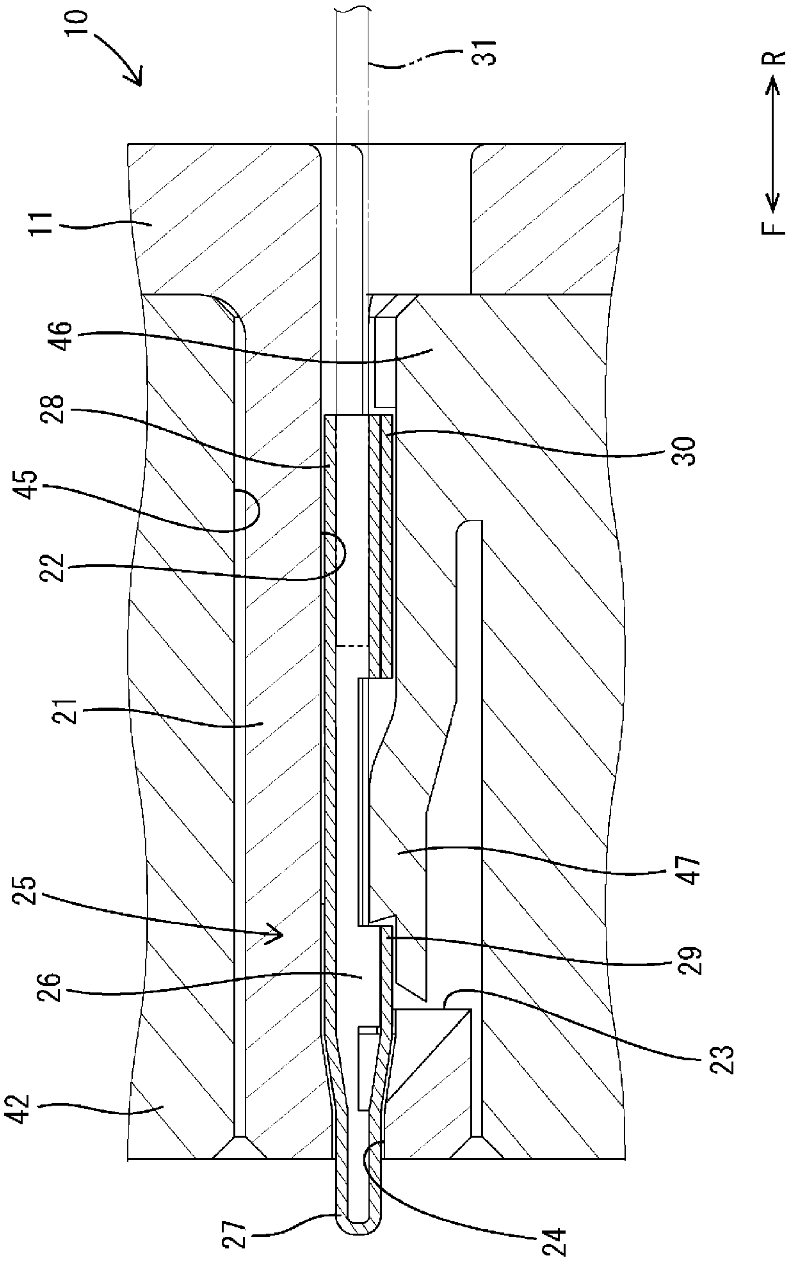
FIG. 8 is a partial enlarged side view in section showing a state where a locking lance retains a terminal fitting with the retainer held at the temporary locking position.
Figure 11:
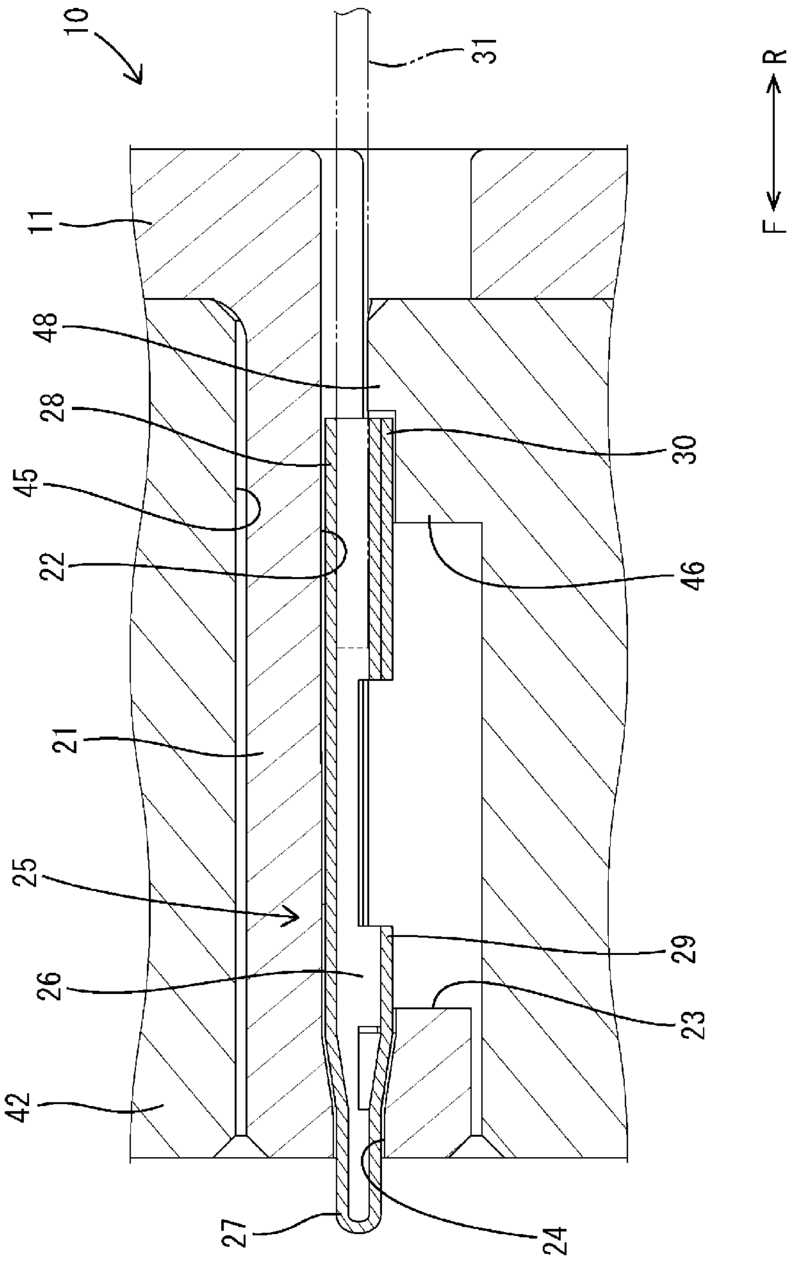
FIG. 11 is a partial enlarged side view in section showing a state where a complete locking portion retains the terminal fitting with the retainer held at the complete locking position.
Figure 12:
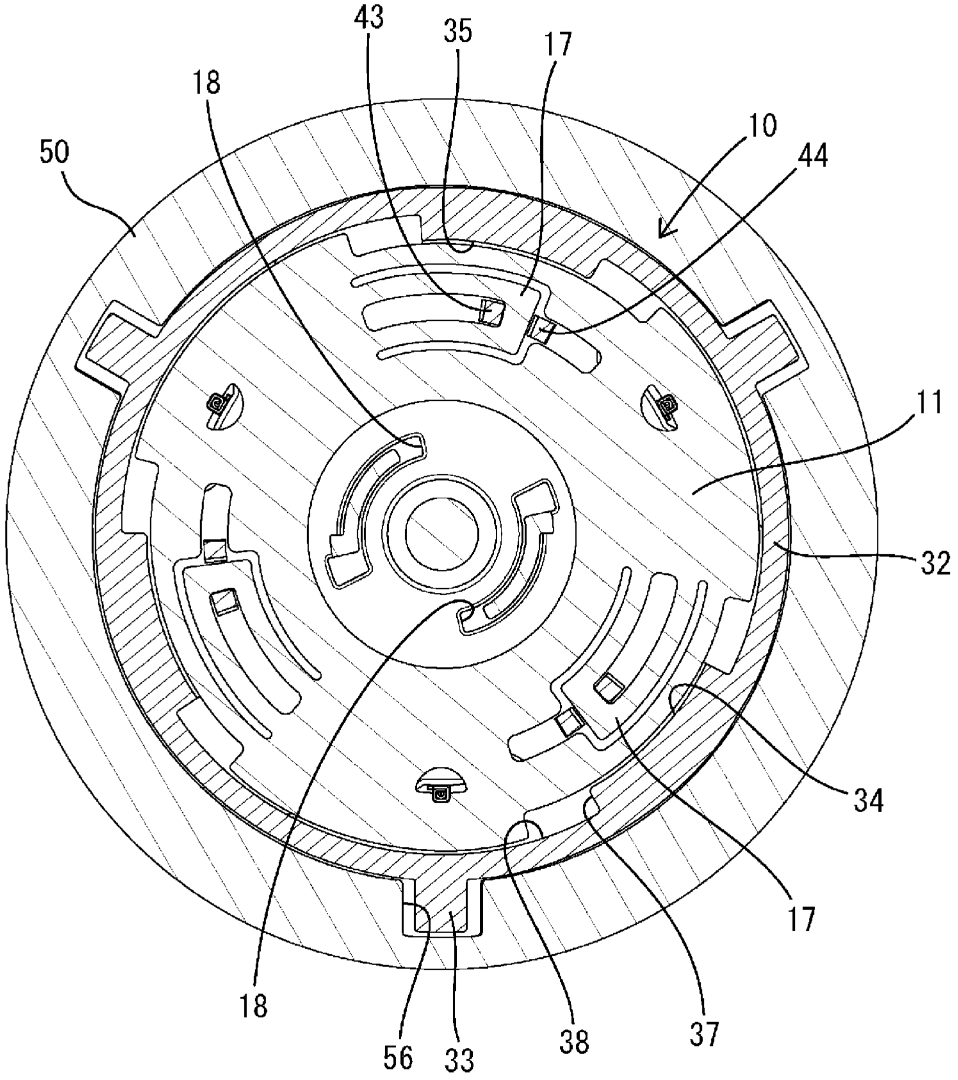
FIG. 12 is a back view in section showing a state where a cover is assembled with the retainer at the complete locking position.

The three terminal accommodating portions 21 are arranged at equal angular intervals in the circumferential direction on one circumference concentric with the disk portion 11. In a front view of the housing 10, the three terminal accommodating portions 21 are arranged to surround the cylindrical portion 12. As shown in FIGS. 7 and 8, a terminal accommodation chamber 22 open in the disk portion 11, i.e. the rear surface 10R of the housing 10, is formed inside the terminal accommodating portion 21. As shown in FIGS. 2 and 3, a cut portion 23 for opening the inside of the terminal accommodation chamber 22 to the outside of the terminal accommodating portion 21 is formed in a region facing the cylindrical portion 12, out of the outer peripheral surface of the terminal accommodating portion 21. As shown in FIGS. 8 and 11, a formation range of the cut portion 23 in the front-rear direction is a region of the terminal accommodation chamber 22 except front and rear end parts. A through hole 24 penetrating into the terminal accommodation chamber 22 from the front end surface of the terminal accommodating portion 21 is formed in the front end part of the terminal accommodating portion 21.

As shown in FIGS. 8 and 11, the terminal fitting 25 has a shape elongated in the front-rear direction as a whole. The terminal fitting 25 includes a terminal body portion 26, a connecting portion 27 projecting forward from the front end of the terminal body portion 26 and a crimping portion 28 arranged behind the terminal body portion 26. The terminal body portion 26 is formed with a stepped primary locking portion 29. A rear end part of the crimping portion 28 is formed with a secondary locking portion 30. The crimping portion 28 is connected to a front end part of a wire 31 by crimping.

Figure 4:
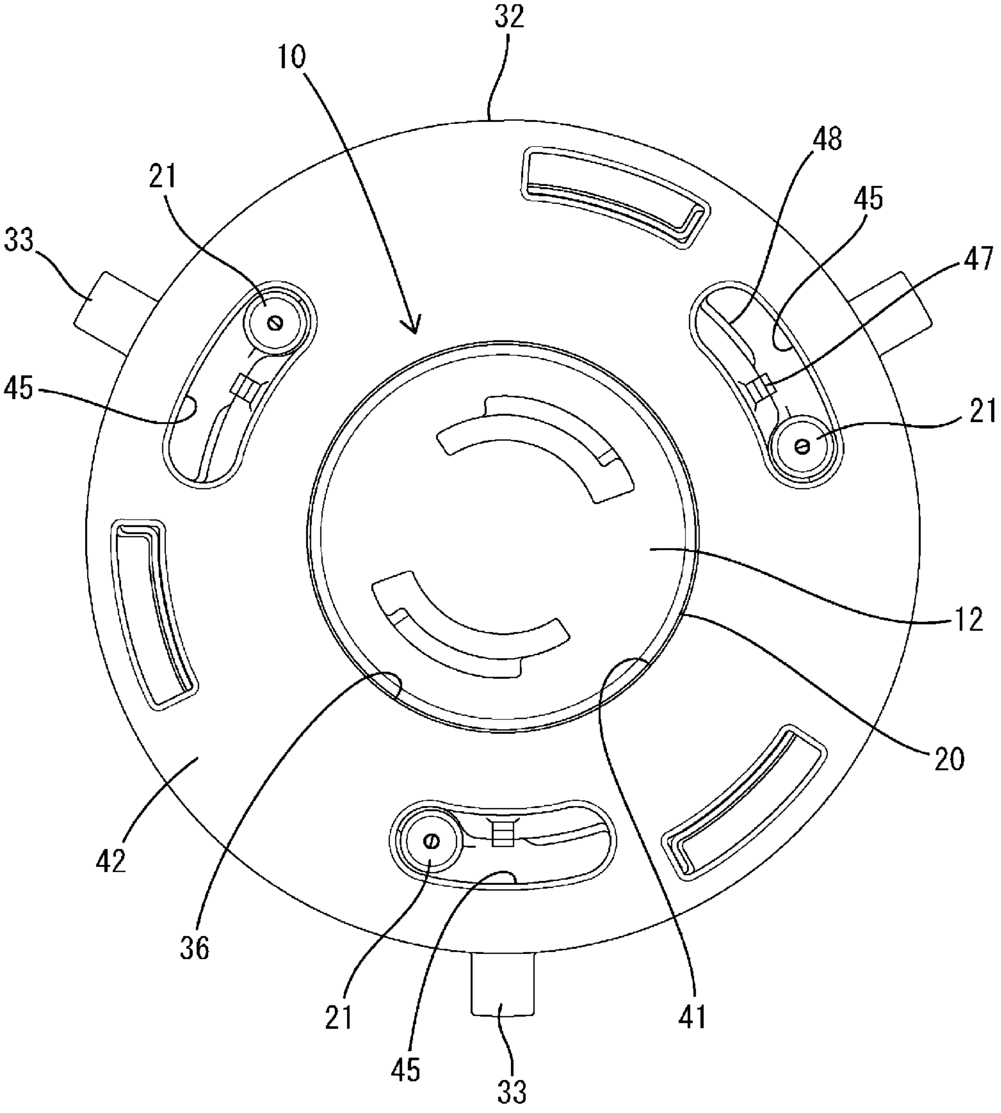
FIG. 4 is a front view showing a state where a housing and a retainer are assembled.

The retainer 32 is a single component made of synthetic resin. As shown in FIG. 4, the retainer 32 has an annular shape in a front view. Three guide pins 33 arranged at equal angular intervals in the circumferential direction are formed on the outer peripheral surface of the retainer 32.

The retainer 32 is formed with an accommodation recess 34 penetrating through the retainer 32 in the front-rear direction. The accommodation recess 34 includes a large-diameter recess 35 formed by shallowly recessing a rear surface 32R of the retainer 32 and a small-diameter recess 36 penetrating from the large-diameter recess 35 to the front end surface of the retainer 32. The large-diameter recess 35 has a circular shape concentric with the retainer 32. An inner diameter of the large-diameter recess 35 is slightly smaller than an outer diameter of the retainer 32. Three guide recesses 37 arranged at equal angular intervals in the circumferential direction are formed in the inner peripheral surface of the large-diameter recess 35. The guide recess 37 has an arc shape concentric with the retainer 32 and is open in the rear surface 32R of the retainer 32. The inner peripheral surface of the guide recess 37 functions as a first inner peripheral guide surface 38 having an arc shape.

Figure 5:
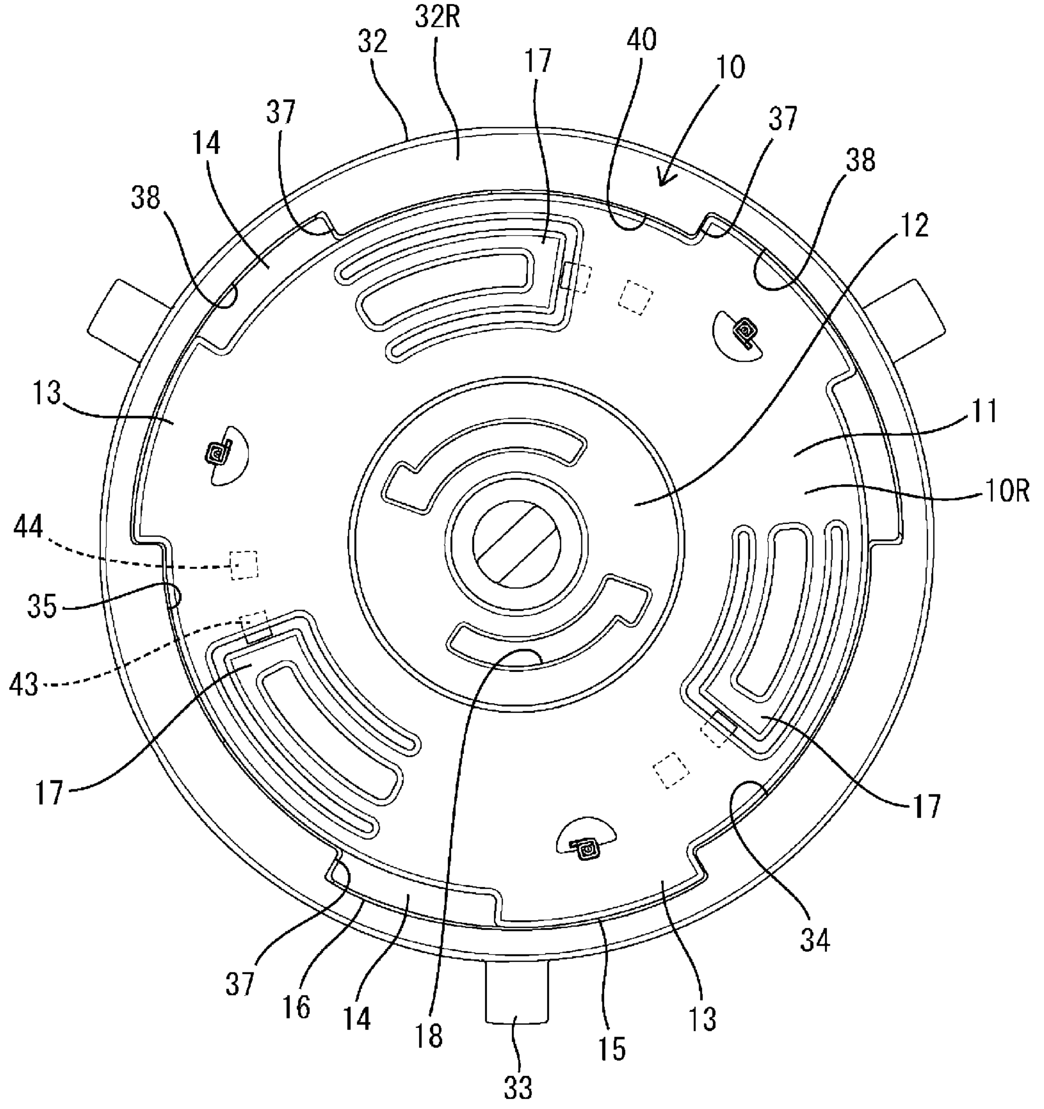
FIG. 5 is a back view showing the state where the housing and the retainer are assembled.

Retaining groove portions 39 recessed into a slit are formed in regions where the guide recesses 37 are not formed, out of the inner peripheral surface of the large-diameter recess 35, as shown in FIG. 3. As shown in FIGS. 5 and 7, the retaining groove portion 39 is arranged adjacent to the guide recess 37 on a clockwise side in a back view. In the back view, an end part of the retaining groove portion 39 on a counterclockwise side communicates with the guide recess 37. Regions where the guide recesses 37 and the retaining groove portions 39 are not formed, out of the inner peripheral surface of the large-diameter recess 35, function as second inner peripheral guide surfaces 40. The small-diameter recess 36 has a circular shape concentric with the retainer 32 and the large-diameter recess 35. The inner peripheral surface of the small-diameter recess 36 functions as a third inner peripheral guide surface 41.

As shown in FIG. 3, a part of the retainer 32 surrounding the small-diameter recess 36 functions as an annular portion 42. The rear surface of the annular portion 42 is facing the inside of the large-diameter recess 35. The rear surface of the annular portion 42 is formed with three pairs of holding projections 43, 44 arranged at equal angular intervals in the circumferential direction. A pair of the holding projections 43, 44 are composed of a first holding projection 43 and a second holding projection 44 spaced apart in the circumferential direction. In a back view, the second holding projection 44 is arranged on a clockwise side of the first holding projection 43.

Figure 6:
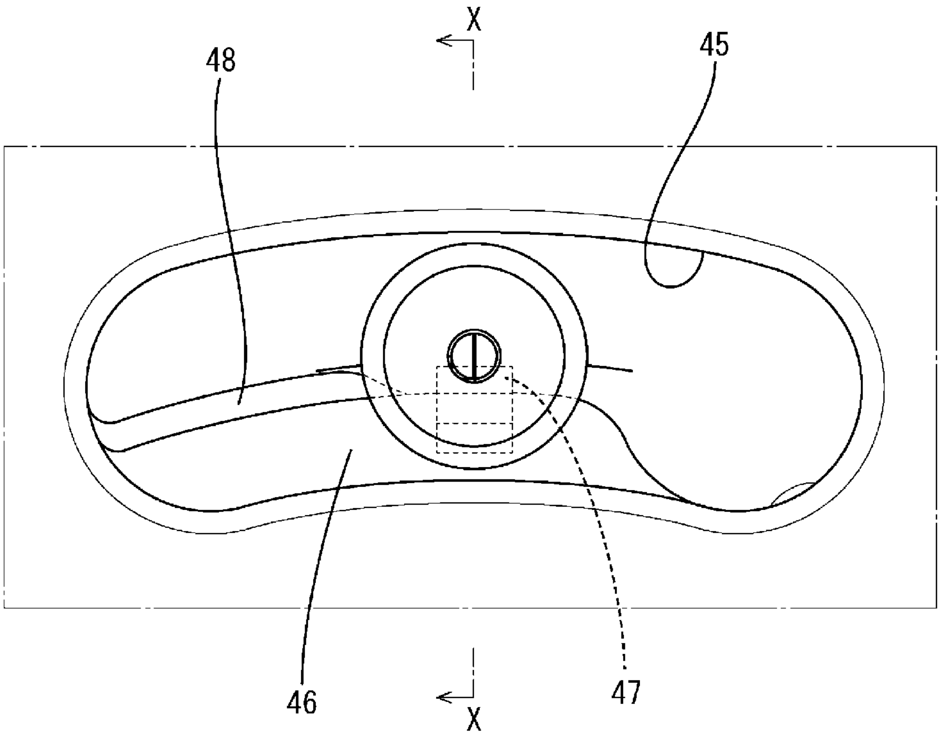
FIG. 6 is a partial enlarged front view showing a state where the retainer is at a temporary locking position.
Figure 9:
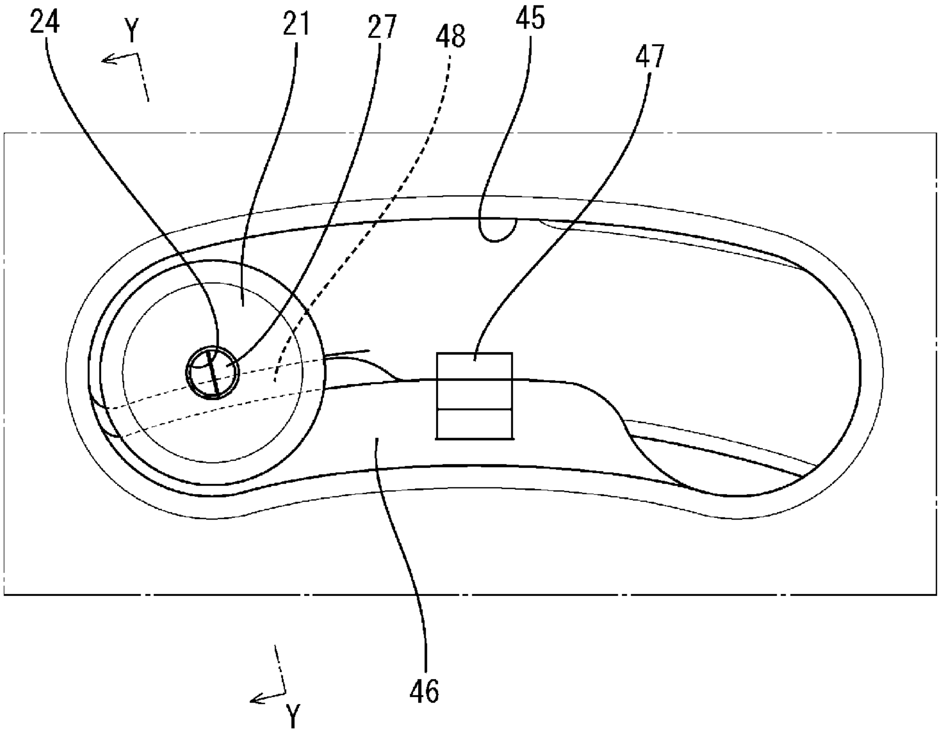
FIG. 9 is a partial enlarged front view showing a state where the retainer is at a complete locking position.

The annular portion 42 is formed with three holding chambers 45 arranged at equal angular intervals in the circumferential direction. The holding chamber 45 penetrates through the annular portion 42 in the front-rear direction. As shown in FIGS. 4, 6 and 9, the holding chamber 45 is shaped by curving an ellipse to have an arc shape concentric with the accommodation recess 34 in a front view of the retainer 32.

An arcuate base portion 46, a locking lance 47 and a complete locking portion 48 are formed in the holding chamber 45. As shown in FIGS. 6 and 9, the arcuate base portion 46 protrudes radially outward to have a concentric arc shape from a radially inner arcuate surface on the inner surface of the holding chamber 45. The arcuate base portion 46 is arranged in a rear end part of the holding chamber 45. A formation range of the arcuate base portion 46 in the circumferential direction is a region of the holding chamber 45 except an end part on the clockwise side in the front view.

The locking lance 47 is arranged in a central part in the circumferential direction of the arcuate base portion 46. The locking lance 47 is cantilevered forward from the arcuate base portion 46. The locking lance 47 can be resiliently displaced in a radial direction with a rear end part of the locking lance 47 as a fulcrum. The locking lance 47 is a part for primarily locking the terminal fitting 25. The complete locking portion 48 is in the form of a rib protruding radially outward from the arcuate base portion 46. A formation range of the complete locking portion 48 in the circumferential direction is a region on a counterclockwise side of the locking lance 47 in the front view. The complete locking portion 48 is arranged behind the locking lance 47.

The cover 50 is a single component made of synthetic resin. As shown in FIGS. 2 and 3, the cover 50 includes a circular rear wall portion 51 and a hollow cylindrical peripheral wall portion 52 projecting forward from the outer peripheral edge of the rear wall portion 51. The rear wall portion 51 is formed with three wire insertion holes 53 arranged at equal angular intervals in the circumferential direction. The rear wall portion 51 is formed with two detecting portions 54 having an arc shape concentric with the rear wall portion 51. The detecting portion 54 projects forward from the rear wall portion 51. As shown in FIGS. 13 and 14, a detecting projection 55 projecting radially outward is formed on an end part of the detecting portion 54 on the clockwise side in a back view. Three guide grooves 56 arranged at equal angular intervals in the circumferential direction are formed in the inner peripheral surface of the peripheral wall portion 52. A front end part of the guide groove 56 is open in the front surface of the peripheral wall portion 52.

Next, an assembly procedure of the connector of this embodiment is described. First, the housing 10 having the terminal fittings 25 not mounted therein yet is accommodated into the accommodation recess 34 from behind the retainer 32. At this time, the cylindrical portion 12 is fit into the short-diameter recess 36, and the disk portion 11 is accommodated into the large-diameter recess 35. The retainer 32 and the housing 10 are positioned in the circumferential direction by fitting the guide protrusions 13 and the retaining ribs 14 into the guide recesses 37. The terminal accommodating portions 21 are accommodated into regions of the holding chambers 45 on the clockwise sides of the locking lances 47 in a front view.

From this state, the retainer 32 is relatively rotated in the clockwise direction in the front view with respect to the housing 10. At this time, the first outer peripheral guide surfaces 15, the second outer peripheral guide surfaces 16 and the third outer peripheral guide surface 20 slide in contact with the first inner peripheral guide surfaces 38, the second inner peripheral guide surfaces 40 and the third inner peripheral guide surface 41. The retainer 32 and the housing 10 are relatively smoothly rotated by a guiding action brought about by the slide contact of these.

If the housing 10 and the retainer 32 are relatively rotated, the retaining ribs 14 are fit into the retaining groove portions 39, whereby the retainer 32 is restricted from being separated forward with respect to the housing 10. If the retainer 32 is rotated to the temporary locking position (position where the terminal accommodating portions 21 cover the locking lances 47 from radially outer sides), the first and second holding projections 43, 44 are locked to the resilient holding pieces 17 to sandwich the resilient holding pieces 17 in the circumferential direction as shown in FIG. 7. By this locking action, the retainer 32 is held at the temporary locking position with respect to the housing 10.

With the retainer 32 held at the temporary locking position, the disk portion 11 and the cylindrical portion 12 of the housing 10 are accommodated in the accommodation recess 34. On the rear surface 32R of the retainer 32, the rear surface 10R of the housing 10 is exposed in an opening of the accommodation recess 34. The rear surface 10R of the housing 10 is at the same position as the rear surface 32R of the retainer 32 in the front-rear direction.

Subsequently, the terminal fittings 25 are inserted into the terminal accommodation chambers 22 from behind the housing 10. In an insertion process, the terminal body portion 26 interferes with the locking lance 47, whereby the locking lance 47 is resiliently displaced radially inward. If the terminal fitting 25 is inserted to a proper position, the connecting portion 27 is fit into the through hole 24 and the locking lance 47 resiliently returns and is locked to the primary locking portion 29. By locking the locking lance 47 to the primary locking portion 29, the terminal fitting 25 is retained.

After the three terminal fittings 25 are inserted into the terminal accommodation chambers 22, the retainer 32 is relatively rotated in the clockwise direction in the front view with respect to the housing 10. If the retainer 32 is rotated to the complete locking position, the retaining ribs 14 come into contact with back end parts of the retaining groove portions 39 and the second holding projections 44 are locked to the resilient holding pieces 17, whereby the retainer 32 is held at the complete locking position. With the retainer 32 held at the complete locking position, the primary locking portions 29 of the terminal fittings 25 and the locking lances 47 of the retainer 32 are separated and the complete locking portions 48 are locked to the secondary locking portions 30 of the terminal fittings 25. The terminal fittings 25 are retained by the locking action of the complete locking portions 48 and the secondary locking portions 30.

After the retainer 32 is rotated to the complete locking position, the cover 50 is assembled with the retainer 32 from behind the housing 10. In assembling, the guide grooves 56 are fit to the guide pins 33, whereby the retainer 32 and the cover 50 are positioned in the circumferential direction. If the cover 50 is brought closer to the retainer 32, the detecting portions 54 are fit into the detection grooves 18 and the detecting projections 55 are fit into the detection recesses 19 as shown in FIG. 14. Note that the wires 31 are inserted through the wire insertion holes 53 in advance.

If the retainer 32 is left at the temporary locking position when the cover 50 is mounted, the detecting projections 55 are deviated from the detection recesses 19 and interfere with opening edge parts of the detection grooves 18 as shown in FIG. 13. Since the cover 50 cannot be assembled with the retainer 32 due to this interference, it is clear that the retainer 32 is left at the temporary locking position, i.e. the retainer 32 has not been moved to the complete locking position.

The connector of this embodiment is provided with the housing 10 for accommodating the terminal fittings 25 and the retainer 32. The retainer 32 is attached to the housing 10 and relatively displaceable between the temporary locking position for enabling the insertion of the terminal fittings 25 into the housing 10 and the complete locking position for restricting the separation of the terminal fittings 25 from the housing 10.

The rear surface 32R, i.e. the outer surface, of the retainer 32 is formed with the accommodation recess 34 for accommodating the housing 10. A displacement path of the retainer 32 from the temporary locking position to the complete locking position is set in a two-dimensional plane parallel to the rear surface 10R of the housing 10 in the opening of the accommodation recess 34, i.e. in a two-dimensional plane parallel to the exposed surface. Even if the rear surface 32R of the retainer 32 and the rear surface 10R of the housing 10 are pressed forward by an external matter, the retainer 32 at the temporary locking position is not relatively displaced to the complete locking position. Therefore, the retainer 32 can be reliably held at the temporary locking position.

The rear surface 10R of the housing 10 is arranged at a position flush with the rear surface 32R of the retainer 32. The resilient holding pieces 17 are also arranged at positions flush with the rear surface 32R of the retainer 32. When an external matter approaches the rear surface 10R of the housing 10, the external matter interferes with the rear surface 32R of the retainer 32. In this way, an impact on the rear surface 10R of the housing 10 and an impact on the resilient holding pieces 17 by the external matter can be mitigated or prevented.

The inner peripheral surface of the accommodation recess 34 has the first to third inner peripheral guide surfaces 38, 40 and 41 having an arc shape, and the outer peripheral surface of the housing 10 has the first to third outer peripheral guide surfaces 15, 16 and 20 having an arc shape. The first to third inner peripheral guide surfaces 38, 40 and 41 and the first to third outer peripheral guide surfaces 15, 16 and 20 individually slide in contact with each other. The retainer 32 is displaced from the temporary locking position to the complete locking position while rotating by the slide contact of these.

When an external matter interferes to rub the rear surface 32R of the retainer 32 and the rear surface 10R of the housing 10, a direction of that interference is a linear direction. In contrast, a movement when the retainer 32 is displaced from the temporary locking position to the complete locking position is a rotational movement. Therefore, even if the external matter interferes to rub the rear surface 32R of the retainer 32 and the rear surface 10R of the housing 10, the retainer 32 at the temporary locking position hardly moves to the complete locking position.

The housing 10 is formed with the resilient holding pieces 17 for holding the retainer 32 at the temporary locking position. The resilient holding pieces 17 are arranged along the rear surface 10R of the housing 10. According to this configuration, since the resilient holding pieces 17 do not project rearward from the rear surface 10R of the housing 10, an external matter hardly interferes with the resilient holding pieces 17. Therefore, the reliability of a holding function by the resilient holding pieces 17 is excellent.

OTHER EMBODIMENTS

The present invention is not limited to the above described and illustrated embodiment, but is represented by claims. The present invention is intended to include all changes in the scope of claims and in the meaning and scope of equivalents and also include the following embodiments.

Although the retainer is displaced from the temporary locking position to the complete locking position while rotating in the above embodiment, a movement path of the retainer from the temporary locking position to the complete locking position may be linear.

Although the accommodation recess is formed in the retainer in the above embodiment, the accommodation recess may be formed in the housing.

Although the resilient holding pieces of the other member (housing) are arranged to be flush with the exposed surface (rear surface) in the above embodiment, the resilient holding pieces may be arranged at positions recessed from the exposed surface or may be arranged at positions projected from the exposed surface.

Although the exposed surface of the other member (housing) is arranged at the position flush with the outer surface (rear surface) of the one member (retainer) in the above embodiment, the exposed surface of the other member may be arranged at a position recessed from the outer surface of the one member or may be arranged at a position projected from the outer surface of the one member.

Although the resilient holding pieces are arranged at the positions flush with the outer surface (rear surface) of the one member (retainer) in the above embodiment, the resilient holding pieces may be arranged at positions retracted from the outer surface of the one member or may be arranged at positions projected from the outer surface of the one member.

LIST OF REFERENCE NUMERALS

10 . . . housing
10R . . . rear surface of housing (exposed surface of other member)
11 . . . disk portion
12 . . . cylindrical portion
13 . . . guide protrusion
14 . . . retaining rib
15 . . . first outer peripheral guide surface
16 . . . second outer peripheral guide surface
17 . . . resilient holding piece
18 . . . detection groove
19 . . . detection recess
20 . . . third outer peripheral guide surface
21 . . . terminal accommodating portion
22 . . . terminal accommodation chamber
23 . . . cut portion
24 . . . through hole
25 . . . terminal fitting
26 . . . terminal body portion
27 . . . connecting portion
28 . . . crimping portion
29 . . . primary locking portion
30 . . . secondary locking portion
31 . . . wire
32 . . . retainer
32R . . . rear surface of retainer (outer surface of one member)
33 guide pin
34 . . . accommodation recess
35 . . . large-diameter recess
36 . . . small-diameter recess
37 . . . guide recess
38 . . . first inner peripheral guide surface
39 . . . retaining groove portion
40 . . . second inner peripheral guide surface
41 . . . third inner peripheral guide surface
42 . . . annular portion
43 . . . first holding projection
44 . . . second holding projection
45 . . . holding chamber
46 . . . arcuate base portion
47 . . . locking lance
48 . . . complete locking portion
50 . . . cover
51 . . . rear wall portion
52 . . . peripheral wall portion
53 . . . wire insertion hole
54 . . . detecting portion
55 . . . detecting projection
56 . . . guide groove

What is claimed is:

1. A connector, comprising:
a housing for accommodating a terminal fitting; and
a retainer attached to the housing, the retainer being relatively displaceable between a temporary locking position for enabling insertion of the terminal fitting into the housing and a complete locking position for restricting separation of the terminal fitting from the housing,
an outer surface of one member, out of the housing and the retainer, being formed with an accommodation recess for accommodating the other member, out of the housing and the retainer, and
a displacement path of the retainer from the temporary locking position to the complete locking position being set in a two-dimensional plane parallel to an exposed surface of the other member in an opening of the accommodation recess,
wherein the other member is formed with a resilient holding piece configured to hold the one member, and
the resilient holding piece is arranged along the exposed surface.

2. The connector of claim 1, wherein the exposed surface of the other member is arranged at a position flush with the outer surface of the one member or at a position recessed from the outer surface.

3. The connector of claim 1, wherein:
an inner peripheral surface of the accommodation recess and an outer peripheral surface of the other member have arcuate guide surfaces capable of sliding in contact with each other, and
the retainer is displaced from the temporary locking position to the complete locking position while rotating by the guide surfaces sliding in contact with each other.

4. The connector of claim 1, wherein:
the resilient holding piece is configured to hold the retainer at the temporary locking position.

5. The connector of claim 1, wherein the resilient holding piece is arranged at a position flush with the outer surface of the one member or at a position recessed from the outer surface.

6. The connector of claim 1, wherein:

the resilient holding piece is in the form of a cantilever arm having an arc shape concentric with the other member.

7. The connector of claim 1, wherein:

the one member is formed with a holding projection configured to be locked to the resilient holding piece.

* * * * *